United States Patent [19]

Lam et al.

[11] Patent Number: 4,729,883

[45] Date of Patent: Mar. 8, 1988

[54] ACID GAS REMOVAL PROCESS

[75] Inventors: Chi W. Lam, Weybridge; Terence J. Ritter; Peter Small, both of Fulham, all of England

[73] Assignee: British Gas Corporation, London, England

[21] Appl. No.: 903,963

[22] Filed: Sep. 5, 1986

[30] Foreign Application Priority Data

Sep. 12, 1985 [GB] United Kingdom ............... 8522575
Oct. 24, 1985 [GB] United Kingdom ............... 8526293

[51] Int. Cl.$^4$ ...................... C01B 17/16; C01B 31/20
[52] U.S. Cl. .................................. 423/228; 423/226; 423/229; 423/232; 423/234
[58] Field of Search .............. 423/226, 228, 232, 229, 423/234

[56] References Cited

U.S. PATENT DOCUMENTS

| 3,856,921 | 12/1974 | Shrier et al. | 423/228 |
| 4,112,052 | 9/1978 | Sartori et al. | 423/228 |

FOREIGN PATENT DOCUMENTS

| 948379 | 7/1970 | Canada | 423/226 |
| 2012119 | 3/1970 | Fed. Rep. of Germany | 423/232 |
| 4319844 | 8/1968 | Japan | 423/232 |

Primary Examiner—Gregory A. Heller
Assistant Examiner—Lori S. Freeman
Attorney, Agent, or Firm—Oblon, Fisher, Spivak, McClelland & Maier

[57] ABSTRACT

The invention relates to a process for the removal of acid gases from gaseous mixtures wherein said mixture is contacted with an aqueous alkaline solution comprising a compound of an alkali metal or ammonia and an alkanolamine-based promoter characterized in that the promoter is a mixture of at least one secondary alkanolamine and at least one N-alkyl-2-aminoethanol, said alkyl radical containing up to 3 carbon atoms.

7 Claims, No Drawings

ACID GAS REMOVAL PROCESS

This invention relates to the purification of gaseous mixtures by the removal of acid gases therefrom. More particularly, the invention is concerned with the removal of carbon dioxide from methane-containing fuel or synthesis gases.

One process for the removal of acid gases such as carbon dioxide, known as the "Hot Pot" or Hot Potassium Carbonate Process, utilises an aqueous alkaline solution of an alkali metal carbonate, e.g. potassium carbonate, as an absorbent for the acid gas, the absorbent being regenerated for re-use by steam-stripping of the carbon dioxide. The performance of the process is governed by the mass transfer rates at which the acid gas molecules are absorbed out of the gas phase into the liquid phase in the contactor and desorbed from the liquid phase into the stripping medium in the regenerator. In UK Patent Specification No. 1084526 it is proposed that mass transfer rates for absorption could be increased by activating the potassium carbonate with an ethanolamine promoter.

Thus where low levels of carbon dioxide were required in the purified gas stream, an ethanolamine such as diethyl 2,2'-dihydroxylamine, also known as diethanolamine or DEA, is added to the carbonate liquor, typically in amounts ranging from 0.3% to 10% by weight of the solution.

In UK Patent Specification No. 1218083, it is stated that secondary alkanolamines have a more beneficial effect on increasing the mass transfer rate for adsorption than the ethanolamines. A comparison between the use of DEA and alkanolamines such as N-methyl-2-aminoethanol (2-(methylamino) ethanol-MAE) or N-ethyl-2-amino ethanol (2-(ethylamino)ethanol-EAE) purports to show that the relative rates of $CO_2$ absorption can be increased up to twofold, for example when EAE is employed as the promoter.

Our own findings have confirmed this except that in large scale applications the greater stability of MAE confers an overall greater commercial advantage than EAE.

We have also discovered that good promotors for adsorption are not necessarily good promotors for regeneration and vice versa. A more efficient process is achieved by the use of a mixture of alkanolamines which promote in different regions of the absorption/regeneration cycle. Thus, greater technical advantages are achieved by the use of mixtures of mono- and dialkanolamines. These advantages have not been disclosed or suggested by the prior art especially since our findings have indicated that by the use of the mixture of promotors increases the mass transfer rates of adsorption and regeneration more than would be expected by the sum of the effect of the individual alkanolamines.

Thus according to the present invention there is provided a process for the removal of acid gases from gaseous mixtures wherein said mixture is contacted with an aqueous alkaline solution comprising a compound of an alkali metal or ammonia and an alkanolamine-based promoter characterised in that said promoter is a mixture of said alkyl radical containing up to 3 carbon atoms.

The preferred secondary amine is diethyl 2,2'-dihydroxyamine and the preferred N-alkyl-2-aminoethanol is N-methyl-2-aminoethanol.

We have found that there is a synergistic effect on the performance of the process shown by the use of mixtures in accordance with the invention which would not be expected from a consideration of the prior art teachings. Our researches have indicated that reducing the level of acid gas e.g. carbon dioxide, is not simply a function of the increase in concentration of the individual amine promoter.

Increasing the concentration of DEA, according to the teachings of UK patent Specification No. 1084526, has little effect on the increase in rate transfer. Thus, for 30% w/w solution of $K_2CO_3$ used to purify the 22% $CO_2$ gas mixture the addition of 2.8% DEA will produce a $CO_2$ level in the purified gas mixture of 2.76% whereas if the solution concentration of DEA is raised to 4.8% the $CO_2$ level is decreased by only 0.36% to 2.4%.

Following the teachings of UK Patent Specification No. 1218083, we have found that increasing the MAE concentration from 1.6 to 2.1% in a 28% $K_2CO_3$ Solution used to purify a gas mixture containing about 22% $CO_2$ results in lowering the $CO_2$ content of the gas exiting the absorber from 2.7 to 2.5%.

It would not be expected therefore from prior art that amine mixtures would have any significant effect upon the rate of mass transfer and hence final acid gas levels in the purified gas mixture. By promoting mass transfer in both the absorption and regeneration stages using a mixture of 2.8% DEA and 2% MAE in a 30% solution of $K_2CO_3$, it was demonstrated that $CO_2$ may be removed from an initial level of about 22% to less than 1.0% in the gas exiting the absorber.

The preferred concentration of carbonate in the scrubbing solution will depend upon the temperature at which the process is carried and will not normally be greater than 50% w/w. Typically this will range from 25 to 40% w/w for reaction temperatures up to 130° C.

Preferably the alkanolamine mixture will comprise up to 7%, usually up to 5%, and more preferably up to 3% w/w of diethyl 2,2'-dihydroxy amine and up to about 4%, usually up to 2.5%, and more preferably from 1 to about 2.0% w/w, of an N-alkyl-2-amino ethanol such as N-methyl-2-aminoethanol.

Although the process of the present invention confers the advantage of being able to achieve low levels of acid gas, where such high levels of purification are not required, the practice of this present invention can result in reduced packed volumes in the chamber or regenerator, or in reduced energy consumption.

With an existing acid gas facility, where a $K_2CO_3$ solution is employed together with diethyl 2,2'-dihydroxyamine, N-alkyl-2-aminoethanol can be added in small increments until the correct composition is achieved in the circulating solution. This 'retrofit' operation improves plant performances without any 'downtime' through solution changeover.

The present invention may be applied to the purification of methane-containing fuel gases as well as synthesis gases used, for example, in the production of ammonia, or in the treatment of natural gas streams.

We claim:

1. A process for the removal of carbon dioxides from gaseous mixtures wherein said mixture is contacted with an aqueous alkaline solution comprising a compound of an alkali metal or ammonia and an alkanolamine-based promoter characterised in that the promoter is a mixture of at least one secondary alkanolamine and at least one N-alkyl-2-aminoethanol, said alkyl radical containing up to 3 carbon atoms.

2. A process as claimed in claim 1 wherein the N-alkyl-2-aminoethanol is N-methyl-2-aminoethanol.

3. A process as claimed in claim 1 wherein the secondary alkanolamine is diethyl-2'2' dihydroxy amine.

4. A process as claimed in claim 4 wherein the concentration of diethyl-2,2' dihydroxy amine is not more than 7% w/w.

5. A process as claimed in claim 1 wherein the concentration of N-alkyl-2-aminoethanol is not more than 4% w/w.

6. A process as claimed in claim 1 wherein the alkali metal compound is potassium carbonate, in a concentration of not greater than 50% by weight.

7. A process as claimed in claim 1 wherein the aqueous alkaline solution additionally includes antifoaming agents, antioxidants and corrosion inhibitors.

* * * * *